United States Patent
Guo et al.

(10) Patent No.: US 11,078,100 B2
(45) Date of Patent: Aug. 3, 2021

(54) METHOD FOR TREATING WASTEWATER IN THE SPHERICAL NICKEL HYDROXIDE PRODUCTION PROCESS

(71) Applicants: Dingjiang Guo, Chengdu (CN); Zhi He, Chengdu (CN); Jinsong He, Chengdu (CN); Chao Liu, Chengdu (CN); Xiangting Cai, Chengdu (CN)

(72) Inventors: Dingjiang Guo, Chengdu (CN); Zhi He, Chengdu (CN); Jinsong He, Chengdu (CN); Chao Liu, Chengdu (CN); Xiangting Cai, Chengdu (CN)

(73) Assignee: Sichuan SiDaNeng Envrionmental Protection Technology Co., Ltd., Chengdu (CN)

(*) Notice: Subject to any disclaimer, the term of this patent is extended or adjusted under 35 U.S.C. 154(b) by 14 days.

(21) Appl. No.: 16/635,279

(22) PCT Filed: Jul. 23, 2018

(86) PCT No.: PCT/CN2018/096615
§ 371 (c)(1),
(2) Date: Jan. 30, 2020

(87) PCT Pub. No.: WO2019/024701
PCT Pub. Date: Feb. 7, 2019

(65) Prior Publication Data
US 2021/0087092 A1  Mar. 25, 2021

(30) Foreign Application Priority Data
Jul. 31, 2017 (CN) .......................... 201710644044.1

(51) Int. Cl.
*C02F 9/00* (2006.01)
*C01C 1/02* (2006.01)
(Continued)

(52) U.S. Cl.
CPC .............. *C02F 9/00* (2013.01); *B01D 11/028* (2013.01); *B01D 19/00* (2013.01); *B01D 36/00* (2013.01);
(Continued)

(58) Field of Classification Search
CPC .. C02F 9/00; C02F 1/441; C02F 1/442; C02F 1/444; C02F 1/66; C02F 2101/16;
(Continued)

(56) References Cited

U.S. PATENT DOCUMENTS 5,310,486 A * 5/1994 Green ........................ C22B 3/18
210/638
5,476,591 A * 12/1995 Green ..................... C02F 1/442
210/638
(Continued)

FOREIGN PATENT DOCUMENTS

CN           1778695     *  5/2006  ................ C02F 1/28

*Primary Examiner* — Joseph W Drodge
(74) *Attorney, Agent, or Firm* — Mersenne Law

(57) ABSTRACT

The invention discloses a method for treating wastewater generated in the spherical nickel hydroxide production process. The invention uses a combined membrane treatment process to systematically and specifically treat process wastewater produced at all stages of the spherical nickel hydroxide preparation process. The concentration of crude wastewater greatly reduces the treatment burden and energy consumption in the evaporation process with obvious environmental protection benefits. In addition, the membrane treatment system has the characteristics of easy control and simple operation. By virtue of the treatment method of the invention, the quality of some produced water can meet the standard of purified water.

10 Claims, 1 Drawing Sheet

(51) Int. Cl.
*C02F 1/44* (2006.01)
*C02F 1/66* (2006.01)
*B01D 61/58* (2006.01)
*B01D 19/00* (2006.01)
*B01D 36/00* (2006.01)
*B01D 11/02* (2006.01)
*B01D 53/58* (2006.01)
*B01D 1/00* (2006.01)
*C02F 101/16* (2006.01)
*C02F 103/16* (2006.01)

(52) U.S. Cl.
CPC ............. *B01D 53/58* (2013.01); *B01D 61/58* (2013.01); *C01C 1/02* (2013.01); *B01D 2311/2649* (2013.01); *B01D 2311/2653* (2013.01); *C02F 1/441* (2013.01); *C02F 1/442* (2013.01); *C02F 1/444* (2013.01); *C02F 1/66* (2013.01); *C02F 2101/16* (2013.01); *C02F 2103/16* (2013.01); *C02F 2301/08* (2013.01)

(58) Field of Classification Search
CPC .. C02F 2103/16; C02F 2301/08; C02F 1/001; C02F 1/04; C02F 2103/34; C02F 1/004; C02F 1/02; C02F 1/048; C02F 1/26; C02F 1/447; C02F 1/52; C01C 1/02; C01C 1/026; B01D 1/00; B01D 3/00; B01D 3/12; B01D 11/02; B01D 11/028; B01D 11/0288; B01D 53/74; B01D 53/75; B01D 53/8621; B01D 53/8634; B01D 61/02; B01D 61/022; B01D 61/025; B01D 61/027; B01D 61/04; B01D 61/10; B01D 61/14; B01D 61/142; B01D 61/145; B01D 61/16; B01D 61/20; B01D 61/364; B01D 61/368; B01D 61/58; B01D 2311/04; B01D 2311/06; B01D 2311/08; B01D 2311/26; B01D 2311/2642; B01D 2311/2653; B01D 2311/2673; B01D 19/00; B01D 19/0068; B01D 36/00; B01D 53/58; B01D 53/77; B01D 2311/2649; C01G 53/04; H01M 4/32; H01M 4/52; H01M 4/525
USPC .......... 210/650, 651, 652, 774, 806; 429/49, 429/223; 423/237, 594.3, 594.19; 203/39, 47

See application file for complete search history.

(56) References Cited

U.S. PATENT DOCUMENTS

| | | | | |
|---|---|---|---|---|
| 6,156,186 | A * | 12/2000 | Mueller | C22B 15/0067 205/560 |
| 6,355,175 | B1 * | 3/2002 | Green | C22B 3/20 210/652 |
| 6,444,363 | B1 * | 9/2002 | Benet | H01M 4/52 429/223 |
| 6,849,208 | B1 * | 2/2005 | Stoller | C01G 53/006 252/519.1 |
| 2003/0141199 | A1 * | 7/2003 | Olbrich | C25B 1/00 205/514 |
| 2004/0131889 | A1 * | 7/2004 | Leddy | H01M 4/32 428/692.1 |
| 2004/0265217 | A1 * | 12/2004 | Olbrich | C01G 53/04 423/594.19 |
| 2014/0263055 | A1 * | 9/2014 | Govindan | B01D 61/025 210/638 |
| 2017/0022585 | A1 * | 1/2017 | Boshoff | C22B 60/0252 |
| 2017/0152583 | A1 * | 6/2017 | Conradie | C22B 3/06 |

* cited by examiner

METHOD FOR TREATING WASTEWATER IN THE SPHERICAL NICKEL HYDROXIDE PRODUCTION PROCESS

FIELD OF THE INVENTION

The invention relates to the technical field of industrial wastewater treatment, in particular to a method for treating wastewater generated in the spherical nickel hydroxide production process.

BACKGROUND OF THE INVENTION

Spherical nickel hydroxide is a non-toxic and harmless light green powder with the characteristics of storing electric energy and slowly releasing electric energy. It is a new green energy material used as an anode material for nickel-hydrogen batteries. Due to small volume, light weight, high energy density, good safety performance, no pollution and appropriate price, nickel-hydrogen batteries are widely used in portable electronic products, electric tools and other equipment, driving the increasing market demand for spherical nickel hydroxide powder.

During the preparation of spherical nickel hydroxide, a large amount of process wastewater will be produced due to such operation processes as extraction, preparation reaction, filtration and elution. As a result of a large amount of metal ions, high ammonia content and unstable pH value, it is very difficult to treat the wastewater, and direct discharge will cause great harm to the environment. At present, the commonly used methods for treating wastewater generated in the spherical nickel hydroxide process section include electrolysis, ion exchange, heating evaporation and biological treatment processes. The processes involve high operating and treatment costs and cannot realize specific staged comprehensive treatment of process wastewater from various production stages, resulting in poor treatment effect of process wastewater and failing to meet national wastewater treatment standards.

SUMMARY OF THE INVENTION

The main purpose of the invention is to provide a method for treating wastewater generated in the spherical nickel hydroxide production process so as to solve the problems of high treatment cost and unsatisfactory treatment effect of the wastewater generated in the spherical nickel hydroxide production process in the prior art.

In order to achieve the object, a method for treating wastewater generated in the spherical nickel hydroxide production process is provided according to one aspect of the invention, namely the method for treating wastewater generated in the spherical nickel hydroxide production process.

A method for treating wastewater generated in the spherical nickel hydroxide production process, characterized by comprising the following steps:

a. introducing raffinate from an extraction stage in a spherical nickel hydroxide production process into a primary membrane concentration and filtration system, which outputs primary concentrate and primary clear liquid after concentrating and filtering the raffinate;

b. introducing spherical nickel hydroxide mother liquid from a filtering stage in the spherical nickel hydroxide production process into a secondary membrane concentration and filtration system, which outputs secondary concentrate and secondary clear liquid after concentrating and filtering the nickel hydroxide mother liquid;

c. introducing spherical nickel hydroxide eluent from an elution stage in the spherical nickel hydroxide production process into a tertiary membrane concentration and filtration system, which outputs tertiary concentrate and tertiary clear liquid after concentrating and filtering the spherical nickel hydroxide eluent;

d. introducing the primary concentrate in Step a into an evaporation system;

e. introducing the secondary concentrate from the secondary membrane concentration and filtration system in Step b and the tertiary concentrate from the tertiary membrane concentration and filtration system in Step c into an ammonia recovery system for ammonia recovery; and f. introducing residual liquid from the ammonia recovery system in Step e into the evaporation system.

The method is used for staged treatment of wastewater supplied from the spherical nickel hydroxide production process, and also for concentration and filtration of process wastewater from all stages of the spherical nickel hydroxide production process, thereby effectively and comprehensively realizing treatment of wastewater from the spherical nickel hydroxide production process.

The invention uses a combined membrane treatment process to systematically and specifically treat process wastewater produced at all stages of the spherical nickel hydroxide preparation process. The concentration of crude wastewater can greatly reduce the treatment burden and energy consumption in the evaporation process with obvious environmental protection benefits. In addition, the membrane treatment system has the characteristics of easy control and simple operation. By virtue of the treatment method of the invention, the quality of some produced water can meet the standard of purified water.

Further, the primary clear liquid in Step a, the secondary clear liquid in Step b, and the tertiary clear liquid in Step c are used as eluent sources for the elution stage in the spherical nickel hydroxide production process. As a result, water can be reused and wasting of water resource is reduced.

Further, ammonia gas from a gas outlet of the ammonia recovery system in Step e is used as an ammonia gas source for the preparation reaction stage. As a result, ammonia is reused in the production system and the production cost of the system is reduced.

Further, each of the primary membrane concentration and filtration system, the secondary membrane concentration and filtration system and the tertiary membrane concentration and filtration system comprises an ultrafiltration membrane filtration system, a nanofiltration membrane filtration system and a multi-stage reverse osmosis membrane filtration system which are sequentially connected; the raffinate in Step a, the spherical nickel hydroxide mother liquid in Step b and the spherical nickel hydroxide eluent in Step c enter the ultrafiltration membrane filtration system in their respective membrane concentration and filtration systems, filtrate from the ultrafiltration membrane filtration system enters the nanofiltration membrane filtration system, filtrate from the nanofiltration membrane filtration system enters the multi-stage reverse osmosis membrane filtration system, the concentrate from the multi-stage reverse osmosis membrane filtration system flows back to the nanofiltration membrane filtration system through a liquid inlet of the nanofiltration membrane filtration system for further filtration, and finally the multi-stage reverse osmosis membrane filtration system outputs clear liquid and the nanofiltration membrane filtration system outputs concentrate. Therefore, the membrane concentration and filtration systems at all stages can filter and concentrate the wastewater generated in each spherical nickel hydroxide production period stage by stage.

Further, the reverse osmosis membrane filtration system is a disk-tube reverse osmosis membrane filtration system. Compared with other reverse osmosis membrane filtration systems, the disk-tube reverse osmosis membrane filtration system has more stable filtration performance. Especially for process wastewater with high salt content produced in the spherical nickel hydroxide production process, the disk-tube reverse osmosis membrane filtration system is not easily blocked during filtration, and the filtering effect is obviously better.

Further, the raffinate in Step a, the spherical nickel hydroxide mother liquid in Step b and the spherical nickel hydroxide eluent in Step c is pretreated respectively before entering the ultrafiltration membrane filtration system. Therefore, the filtration burden of the ultrafiltration membrane filtration system is reduced, and some large particles and obvious impurities can be preliminarily filtered.

Further, the pretreatment comprises removing turbidity, cooling and adjusting pH of the raffinate in Step a, the spherical nickel hydroxide mother liquid in Step b and the spherical nickel hydroxide eluent in Step c. Therefore, the raffinate in Step a, the spherical nickel hydroxide mother liquid in Step b and the spherical nickel hydroxide eluent in Step c are pretreated thoroughly, reducing the filtration and concentration burden for subsequent treatment procedures and ensuring the quality of produced water and products.

Further, the ultrafiltration membrane filtration system is a filtration system for filtering particles of molecular weight >500 and particle size >0.005 μm.

Under such condition, the ultrafiltration membrane filtration system can filter liquid in a better way with the best filtering effects.

Further, the nanofiltration membrane filtration system is a filtration system for filtering particles of molecular weight of 150-500 and size of 0.0005-0.005 μm.

Under such condition, the nanofiltration membrane filtration system can filter and concentrate liquid in a better way with the best filtration and concentration effects.

Further, the reverse osmosis membrane filtration system is a filtration system for filtering particles of molecular weight of 50-150 and size of 0.0001-0.001 μm.

Under such condition, the reverse osmosis membrane filtration system can filter and concentrate liquid in a better way.

According to another aspect of the invention, a system is further provided for treating wastewater generated in the spherical nickel hydroxide production process, comprising a primary membrane concentration and filtration system, a secondary membrane concentration and filtration system and a tertiary membrane concentration and filtration system. The primary membrane concentration and filtration system is provided with an extract wastewater inlet, a primary clear liquid outlet and a primary concentrate outlet; the secondary membrane concentration and filtration system is provided with a spherical nickel hydroxide mother liquid inlet, a secondary clear liquid outlet and a secondary concentrate outlet; the tertiary membrane concentration and filtration system is provided with a spherical nickel hydroxide eluent inlet, a tertiary clear liquid outlet and a tertiary concentrate outlet. The primary concentrate outlet is connected with an evaporation system; the secondary concentrate outlet and the tertiary concentrate outlet both are connected with an ammonia recovery system; a liquid outlet of the ammonia recovery system is connected with the evaporation system. The method above is used for staged treatment of wastewater supplied from the spherical nickel hydroxide production process, and also for concentration and filtration of process wastewater from all stages of the spherical nickel hydroxide production process, thereby effectively and comprehensively realizing treatment of wastewater from the spherical nickel hydroxide production process. The invention uses a combined membrane treatment process to systematically and specifically treat process wastewater produced at all stages of the spherical nickel hydroxide preparation process. The concentration of crude wastewater greatly reduces the treatment burden and energy consumption in the evaporation process with obvious environmental protection benefits. In addition, the membrane treatment system has the characteristics of easy control, simple operation and uncomplicated structure. By virtue of the treatment method of the invention, the quality of some produced water can meet the standard of purified water.

Further, the primary clear liquid outlet, the secondary clear liquid outlet and the tertiary clear liquid outlet are used as spherical nickel hydroxide eluent feed inlets. Therefore, clear liquid from the primary clear liquid outlet, the secondary clear liquid outlet and the tertiary clear liquid outlet can be reused as spherical nickel hydroxide eluent feed water, which saves water resources and reduces the treatment costs of the system.

Further, the primary clear liquid outlet, the secondary clear liquid outlet and the tertiary clear liquid outlet are converged and communicated to form a spherical nickel hydroxide eluent feed inlet, which allows the system structure more compact, reducing pipeline coverage and space required.

Further, the gas outlet of the ammonia recovery system serves as an ammonia feed inlet. Therefore, gas from the gas outlet of the ammonia recovery system can be reused, thereby saving ammonia resources, further reducing the production cost of spherical nickel hydroxide and realizing the reuse of a single resource.

Further, each of the primary membrane concentration and filtration system, the secondary membrane concentration and filtration system and the tertiary membrane concentration and filtration system comprises a pretreatment system, an ultrafiltration membrane filtration system, a nanofiltration membrane filtration system and a reverse osmosis membrane filtration system which are sequentially connected. Therefore, the membrane concentration and filtration systems at all stages can filter and concentrate the wastewater from each spherical nickel hydroxide production period stage by stage.

Further, the ultrafiltration membrane filtration system is a filtration system for filtering particles of molecular weight >50 and size >10 nm, the nanofiltration membrane filtration system is a filtration system for filtering particles of molecular weight of 150-500 and size of 0.0005-0.005 μm, and the reverse osmosis membrane filtration system is a filtration system for filtering particles of molecular weight of 50-150 and size of 0.0001-0.001 μm. Under such conditions, the ultrafiltration membrane filtration system can filter liquid with the best filtering effects, and the nanofiltration membrane filtration system and the reverse osmosis membrane filtration system can filter and concentrate liquid with the best filtration and concentration effects.

Further, filter membranes of the ultrafiltration membrane filtration system, the nanofiltration membrane filtration system and the reverse osmosis membrane filtration system are selected from one of intermetallic compound filter membranes, ceramic filter membranes and high molecular polymer filter membranes. Compared with common filter membranes, the filter membranes have better filtering effects, better filtration stability and higher application strength, and are especially suitable for process wastewater with high salt content produced in the spherical nickel hydroxide production process.

Further, the pretreatment system comprises a primary filtration system, a pH regulating device and a cooling device. Therefore, the raffinate in Step a, the spherical nickel hydroxide mother liquid in Step b and the spherical nickel hydroxide eluent in Step c is pretreated thoroughly, reducing the filtration and concentration burden for subsequent treatment procedures and ensuring the quality of produced water and products.

Further, the reverse osmosis membrane filtration system comprises at least a primary disk-tube reverse osmosis membrane filtration system, of which a concentrate outlet is communicated with a liquid inlet of the nanofiltration membrane filtration system.

Further, the ammonia recovery system comprises a distillation system or a rectification system. Therefore, ammonia can be effectively recovered.

It is clear that the invention uses a combined membrane treatment process to systematically and specifically treat process wastewater produced at all stages of the spherical nickel hydroxide preparation process. The concentration of crude wastewater greatly reduces the treatment burden and reduces energy consumption in the evaporation process with obvious environmental protection benefits. In addition, the membrane treatment system has the characteristics of easy control and simple operation. By virtue of the treatment method of the invention, the quality of some produced water can meet the standard of purified water.

Both the method and the system for treating wastewater generated in the spherical nickel hydroxide production process of the invention are applicable to the technical field of spherical nickel hydroxide production processes, and beneficial to producing spherical nickel hydroxide with better product quality while saving resources and reducing production costs.

The invention will be further described in combination with drawings and preferred embodiments. Some additional aspects and advantages of the invention will be given in the following description, and some additional aspects and advantages will be apparent from the description below or learned by practice of the invention.

BRIEF DESCRIPTION OF DRAWINGS

The drawings which form a part of the invention are used to assist in understanding of the invention. The contents provided in the drawings and related description in the invention can be used to explain the invention, but not improperly limit thereto. In the drawings.

Figure 1:
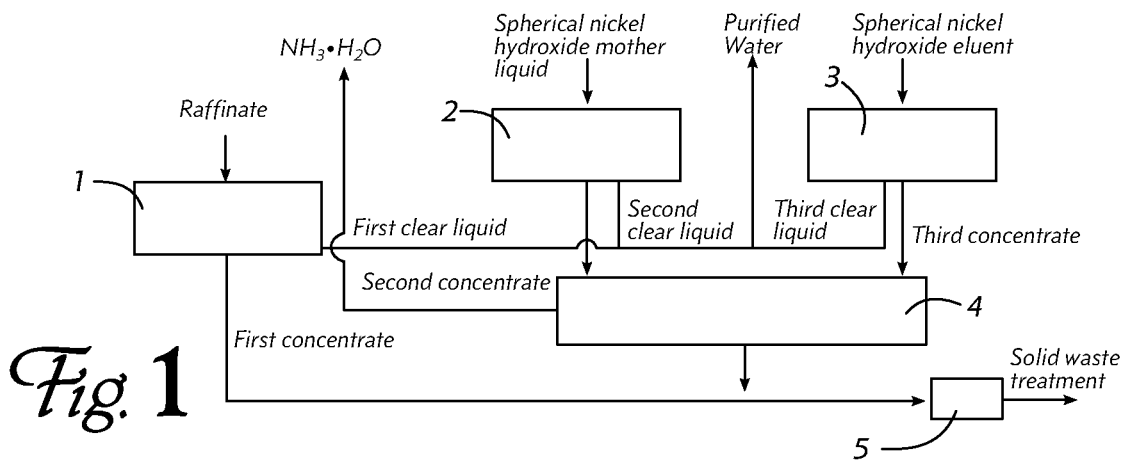
FIG. 1 is a schematic flow diagram of equipment of a system for treating wastewater generated in the spherical nickel hydroxide production process in the invention.

Relevant symbols in the above drawings represent:
1. primary membrane concentration and filtration system;
2. secondary membrane concentration and filtration system;
3. tertiary membrane concentration and filtration system;
4. ammonia recovery system;
5. evaporation system;
61: ultrafiltration membrane filtration system;
62: nanofiltration membrane filtration system;
63: primary disk-tube reverse osmosis membrane filtration system;
64: primary disk-tube reverse osmosis membrane filtration system.

DETAILED DESCRIPTION OF PREFERRED EMBODIMENTS

The invention will be clearly and completely described in combination with drawings. Those with ordinary skill in the art will be able to implement the invention based on the description. Before the invention is described in combination with drawings, it should be specially noted that:

The technical solutions and technical features provided in all parts of the invention, including the following description, can be combined with each other without conflict.

In addition, the examples referred to in the following description are only some examples of the invention generally, but not all examples. Therefore, based on the examples of the invention, all other examples obtained by those with ordinary skill in the art without creative work should fall within the protection scope of the invention.

Terms and units in the invention. The terms "comprise", "include" and any variants thereof in the specification, claims and related parts of the invention are intended to cover non-exclusive inclusion.

On one aspect, the invention provides a method for treating wastewater generated in the spherical nickel hydroxide production process, which comprises the following steps:

a. introducing raffinate from an extraction stage in a spherical nickel hydroxide production process into a primary membrane concentration and filtration system (1), which outputs primary concentrate and primary clear liquid after concentrating and filtering the raffinate;

b. introducing spherical nickel hydroxide mother liquid from a filtering stage in the spherical nickel hydroxide production process into a secondary membrane concentration and filtration system (2), which outputs secondary concentrate and secondary clear liquid after concentrating and filtering the nickel hydroxide mother liquid;

c. introducing spherical nickel hydroxide eluent from an elution stage in the spherical nickel hydroxide production process into a tertiary membrane concentration and filtration system (3), which outputs tertiary concentrate and tertiary clear liquid after concentrating and filtering the spherical nickel hydroxide eluent;

d. introducing the primary concentrate in Step a into an evaporation system (5);

e. introducing the secondary concentrate from the secondary membrane concentration and filtration system (2) in Step b and the tertiary concentrate from the tertiary membrane concentration and filtration system (3) in Step c into an ammonia recovery system (4) for ammonia recovery; and f. introducing the residual liquid from the ammonia recovery system (4) in Step e into the evaporation system (5).

The primary clear liquid in Step a, the secondary clear liquid in Step b, and the tertiary clear liquid in Step c is used as eluent sources for the elution stage in the spherical nickel hydroxide production process.

Ammonia gas from a gas outlet of the ammonia recovery system (4) in Step e is used as an ammonia gas source for the preparation reaction stage.

Each of the primary membrane concentration and filtration system (1), the secondary membrane concentration and filtration system (2) and the tertiary membrane concentration and filtration system (3) comprises an ultrafiltration membrane filtration system (61), a nanofiltration membrane filtration system (62) and a multi-stage reverse osmosis membrane filtration system which are sequentially connected; the raffinate in Step a, the spherical nickel hydroxide mother liquid in Step b and the spherical nickel hydroxide eluent in Step c enters the ultrafiltration membrane filtration system (61) in their respective membrane concentration and filtration systems, filtrate from the ultrafiltration membrane filtration system (61) enters the nanofiltration membrane filtration system (62), filtrate from the nanofiltration membrane filtration system (62) enters the multi-stage reverse osmosis membrane filtration system, the concentrate from the multi-stage reverse osmosis membrane filtration system flows back to the nanofiltration membrane filtration system (62) through a liquid inlet of the nanofiltration membrane filtration system (62) for further filtration, and finally the multi-stage reverse osmosis membrane filtration system outputs clear liquid and the nanofiltration membrane filtration system (62) outputs concentrate.

The reverse osmosis membrane filtration system is a disk-tube reverse osmosis membrane filtration system.

The raffinate in Step a, the spherical nickel hydroxide mother liquid in Step b and the spherical nickel hydroxide eluent in Step c is pretreated respectively before entering the ultrafiltration membrane filtration system (61).

The pretreatment comprises removing turbidity, cooling and adjusting pH of the raffinate in Step a, the spherical nickel hydroxide mother liquid in Step a and the spherical nickel hydroxide eluent in Step c.

The ultrafiltration membrane filtration system is a filtration system for filtering particles of molecular weight >500 and size >0.005 μm.

The nanofiltration membrane filtration system (62) is a filtration system for filtering particles of molecular weight of 150-500 and size of 0.0005-0.005 μm.

The reverse osmosis membrane filtration system is a filtration system tor filtering particles of molecular weight of 50-150 and size of 0.0001-0.001 μm.

The invention further provides a system for treating wastewater generated in the spherical nickel hydroxide production process, which comprises a primary membrane concentration and filtration system (1), a secondary membrane concentration and filtration system (2) and a tertiary membrane concentration and filtration system (3). The primary membrane concentration and filtration system (1) is provided with a raffinate inlet, a primary clear liquid outlet and a primary concentrate outlet; the secondary membrane concentration and filtration system (2) is provided with a spherical nickel hydroxide mother liquid inlet, a secondary clear liquid outlet and a secondary concentrate outlet; the tertiary membrane concentration and filtration system (3) is provided with a spherical nickel hydroxide eluent inlet, a tertiary clear liquid outlet and a tertiary concentrate outlet, The primary concentrate outlet is connected with an evaporation system (5), the secondary concentrate outlet and the tertiary concentrate outlet are connected with an ammonia recovery system (4), and a liquid outlet of the ammonia recovery system (4) is connected with the evaporation system (5).

The primary clear liquid outlet, the secondary clear liquid outlet and the tertiary clear liquid outlet are used as spherical nickel hydroxide eluent feed inlets.

The primary clear liquid outlet, the secondary clear liquid outlet and the tertiary clear liquid outlet are converged and communicated to form a spherical nickel hydroxide eluent feed inlet.

The gas outlet of the ammonia recovery system (4) serves as an ammonia feed inlet.

Each of the primary membrane concentration and filtration system (1), the secondary membrane concentration and filtration system (2) and the tertiary membrane concentration and filtration system (3) comprises a pretreatment system, an ultrafiltration membrane filtration system (61), a nanofiltration membrane filtration system (62) and a reverse osmosis membrane filtration system which are sequentially connected.

The ultrafiltration membrane filtration system (61) is a filtration system for filtering particles of molecular weight >500 and size >0.005 μm, the nanofiltration membrane filtration system (62) is a filtration system for filtering particles of molecular weight of 150-500 and size of 0.0005-0.005 μm, and the reverse osmosis membrane filtration system is a filtration system for filtering particles of molecular weight of 50-150 and size of 0.0001-0.001 μm.

Filter membranes of the ultrafiltration membrane filtration system (61), the nanofiltration membrane filtration system (62) and the reverse osmosis membrane filtration system are selected from one of intermetallic compound filter membranes, ceramic filter membranes and high molecular polymer filter membranes.

The pretreatment system (65) comprises a primary filtration system, a pH regulating device and a cooling device.

The reverse osmosis membrane filtration system comprises at least a primary disk-tube reverse osmosis membrane filtration system, of which a concentrate outlet is communicated with a liquid inlet of the nanofiltration membrane filtration system (62).

The ammonia recovery system (4) comprises a distillation system or a rectification system.

The invention uses a combined membrane treatment process to systematically and specifically treat process wastewater produced at all stages of the spherical nickel hydroxide preparation process, with overall consideration of the application value of effluent. The concentration of crude wastewater greatly reduces the treatment burden and reduces energy consumption in the evaporation process with obvious environmental protection benefits. In addition, the membrane treatment system has the characteristics of easy control and simple operation. By virtue of the treatment method of the invention, the quality of some produced water can meet the standard of purified water.

FIG. 1 is a schematic flow diagram of equipment of a system for treating wastewater generated in the spherical nickel hydroxide production process in the invention. As shown in FIG. 1, a system for treating wastewater generated in the spherical nickel hydroxide production process in the preferred embodiment comprises a primary membrane concentration and filtration system (1), a secondary membrane concentration and filtration system (2) and a tertiary membrane concentration and filtration system (3). The secondary membrane concentration and filtration system (2) is provided with a spherical nickel hydroxide mother liquid inlet, a secondary clear liquid outlet and a secondary concentrate outlet; the tertiary membrane concentration and filtration system (3) is provided with a spherical nickel hydroxide eluent inlet, a tertiary clear liquid outlet and a tertiary concentrate outlet. The liquid inlet of the primary membrane concentration and filtration system (1) is the inlet of raffinate from an extraction stage in the spherical nickel hydroxide production process, and the inlet of the secondary membrane concentration and filtration system (2) is the inlet of spherical nickel hydroxide mother liquid during centrifugation and filtration in the spherical nickel hydroxide production process, The liquid inlet of the tertiary membrane concentration and filtration system (3) is the inlet of spherical nickel hydroxide eluent produced during elution in the spherical nickel hydroxide production process. The primary clear liquid outlet, the secondary clear liquid outlet and the tertiary clear liquid outlet are converged and communicated as a spherical nickel hydroxide eluent feed inlet. The primary concentrate outlet is communicated with the evaporation system (5), the secondary concentrate outlet and the tertiary concentrate outlet are communicated with the ammonia recovery system (4) comprising a distillation system or a rectification system; ammonia gas is discharged from a gas outlet of the ammonia recovery system (4), and the residual liquid after distillation is discharged from a liquid outlet of the ammonia recovery system (4). The primary concentrate outlet is connected with the evaporation system (5), the secondary concentrate outlet and the tertiary concentrate outlet are connected with the ammonia recovery system (4), and the liquid outlet of the ammonia recovery system (4) is connected with the evaporation system (5).

Figure 2:
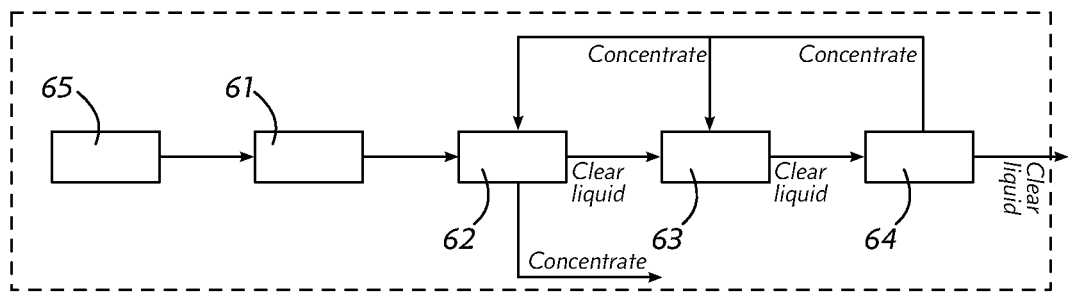
FIG. 2 is a schematic flow diagram of equipment of membrane concentration and filtration systems in the invention.

The primary membrane concentration and filtration system, the secondary membrane concentration and filtration system and the tertiary membrane concentration and filtration system are identical in composition. FIG. 2 is a schematic flow diagram of equipment of membrane concentration and filtration systems in the invention. As shown in FIG. 2, each of the membrane concentration and filtration systems in the preferred embodiment comprises a pretreatment system (65), an ultrafiltration membrane filtration system (61), a nanofiltration membrane filtration system (62), a first disk-tube reverse osmosis membrane filtration system (63) and a second disk-tube reverse osmosis membrane filtration system (64) which are sequentially connected. Both the concentrate outlet of the first disk-tube reverse osmosis membrane filtration system (63) and the concentrate outlet of the second disk-tube reverse osmosis membrane filtration system (65) return to communicate with the liquid inlet of the nanofiltration membrane filtration system (62).

Figure 3:
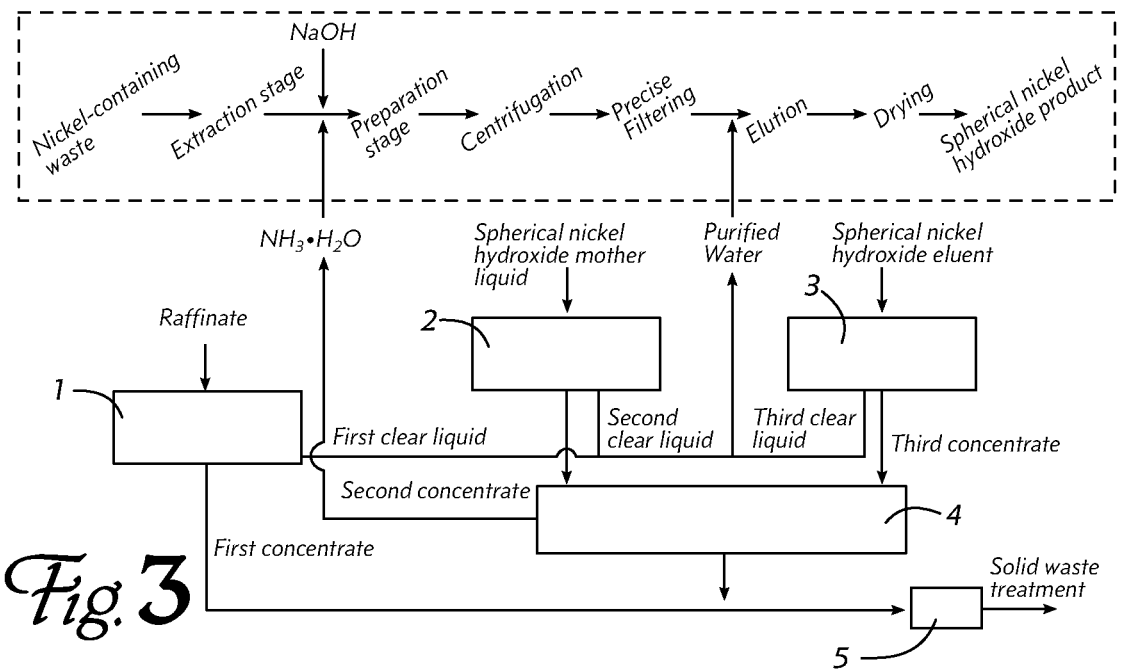
FIG. 3 is a schematic diagram of the application of the system for treating wastewater generated in the spherical nickel hydroxide production process in the invention to the spherical nickel hydroxide production process.

FIG. 3 is a schematic diagram of the application of the system for treating wastewater generated in the spherical nickel hydroxide production process in the invention to the spherical nickel hydroxide production process. As shown in FIG. 3, the spherical nickel hydroxide production process basically includes an extraction stage, a preparation stage, centrifugation, precise filtering, elution and drying, and nickel-containing wastes are treated by the process steps in sequence to finally produce spherical nickel hydroxide products. In the invention, the liquid inlet of the primary membrane concentration and filtration system (1) in the system for treating wastewater generated in the spherical nickel hydroxide production process is used for introducing raffinate from the extraction stage, the liquid inlet of the secondary membrane concentration and filtration system (2) is used for introducing spherical nickel hydroxide mother liquid produced during centrifugation and precise filtering, and the liquid inlet of the tertiary membrane concentration and filtration system (3) is used for introducing spherical nickel hydroxide eluent produced during elution. The clear liquid outlets of the primary membrane concentration and filtration system (1), the secondary membrane concentration and filtration system (2) and the tertiary membrane concentration and filtration system (3) are used as feed inlets for elution.

The ultrafiltration membrane filtration system (61) is a filtration system for filtering particles of molecular weight >500 and size >0.005 μm, the nanofiltration membrane filtration system (62) is a filtration system for filtering particles of molecular weight of 150-500 and size of 0.0005-0.005 μm, and the reverse osmosis membrane filtration system is a filtration system for filtering particles of molecular weight of 50-150 and size of 0.0001-0.001 μm.

Filter membranes of the ultrafiltration membrane filtration system (61), the nanofiltration membrane filtration system (62) and the reverse osmosis membrane filtration system are selected from one of intermetallic compound filter membranes, ceramic filter membranes and high molecular polymer filter membranes.

The pretreatment system (65) comprises a primary filtration system, a pH regulating device and a cooling device.

The invention realizes the recycling of wastewater from all stages of the spherical nickel hydroxide production process, which greatly reduces spherical nickel hydroxide production costs and wastewater treatment costs. The concentration of crude wastewater greatly reduces the treatment burden of evaporation process, and reduces energy consumption with obvious environmental protection benefits. In addition, the membrane treatment system has the characteristics of easy control and simple operation. By virtue of the treatment method of the invention, the quality of some produced water can meet the standard of purified water.

Relevant contents of the invention have been described above. Those with ordinary skill in the art will be able to implement the invention based on the description. Based on the contents of the invention, all other examples obtained by those with ordinary skill in the art without creative work should fall within the protection scope of the invention.

The invention claimed is:

1. A method for treating wastewater generated during a spherical nickel hydroxide production process having an extraction stage, a filtering stage and an elution stage, the wastewater treatment method characterized by comprising the following steps:
   a. introducing raffinate from an extraction stage in the spherical nickel hydroxide production process into a primary membrane concentration and filtration system (1), which outputs primary concentrate and primary clear liquid after concentrating and filtering the raffinate;
   b. introducing spherical nickel hydroxide mother liquid from a filtering stage in the spherical nickel hydroxide production process into a secondary membrane concentration and filtration system (2), which outputs secondary concentrate and secondary clear liquid after concentrating and filtering the spherical nickel hydroxide mother liquid;
   c. introducing spherical nickel hydroxide eluent from an elution stage in the spherical nickel hydroxide production process into a tertiary membrane concentration and filtration system (3), which outputs tertiary concentrate and tertiary clear liquid after concentrating and filtering the spherical nickel hydroxide eluent;
   d. introducing the primary concentrate output in Step a into an evaporation system (5);
   e. introducing the secondary concentrate output from the secondary membrane concentration and filtration system (2) in Step b and the tertiary concentrate output from the tertiary membrane concentration and filtration system (3) in Step c into an ammonia recovery system (4) for ammonia recovery, said ammonia recovery system to output a residual liquid; and f. introducing the residual liquid from the ammonia recovery system (4) in Step e into the evaporation system (5).

2. The method for treating wastewater generated during the spherical nickel hydroxide production process according to claim 1, characterized in that the primary clear liquid in Step a, the secondary clear liquid in Step b, and the tertiary clear liquid in Step c are used as eluent sources for the elution stage in the spherical nickel hydroxide production process.

3. The method for treating wastewater generated during the spherical nickel hydroxide production process according to claim 1, characterized in that ammonia gas from a gas outlet of the ammonia recovery system (4) in Step e is used as an ammonia gas supply source for a preparation reaction stage of the spherical nickel hydroxide production process.

4. The method for treating wastewater generated during the spherical nickel hydroxide production process according to claim 1, characterized in that each of the primary membrane concentration and filtration system (1), the secondary membrane concentration and filtration system (2) and the tertiary membrane concentration and filtration system (3) comprises an ultrafiltration membrane filtration system (61), a nanofiltration membrane filtration system (62) and a multi-stage reverse osmosis membrane filtration system which are sequentially connected;

the raffinate in Step a, the spherical nickel hydroxide mother liquid in Step b and the spherical nickel hydroxide eluent in Step c enter the ultrafiltration membrane filtration system (61) in the respective membrane concentration and filtration systems, filtrate from the ultrafiltration membrane filtration system (61) enters the nanofiltration membrane filtration system (62), filtrate from the nanofiltration membrane filtration system (62) enters the multi-stage reverse osmosis membrane filtration system, concentrate from the multi-stage reverse osmosis membrane filtration system flows back to the nanofiltration membrane filtration system (62) through a liquid inlet of the nanofiltration membrane filtration system (62) for further filtration, and finally the multi-stage reverse osmosis membrane filtration system outputs clear liquid and the nanofiltration membrane filtration system (62) outputs solid waste.

5. The method for treating wastewater generated during the spherical nickel hydroxide production process according to claim 4, characterized in that the reverse osmosis membrane filtration system of each of the primary membrane concentration and filtration system, the secondary membrane concentration and filtration system and the tertiary membrane concentration and filtration systems is a disk-tube reverse osmosis membrane filtration system.

6. The method for treating wastewater generated during the spherical nickel hydroxide production process according to claim 4, characterized in that each of the raffinate in Step a, the spherical nickel hydroxide mother liquid in Step b and the spherical nickel hydroxide eluent in Step c are pretreated before entering the ultrafiltration membrane filtration system (61).

7. The method for treating wastewater generated during the spherical nickel hydroxide production process according to claim 6, characterized in that the pretreatment comprises removing turbidity, cooling and adjusting pH of the raffinate in Step a, the spherical nickel hydroxide mother liquid in Step b and the spherical nickel hydroxide eluent in Step c.

8. The method for treating wastewater generated in the spherical nickel hydroxide production process according to claim 4, characterized in that the ultrafiltration membrane filtration system (61) of each of the primary membrane concentration and filtration system, the secondary membrane concentration and filtration system and the tertiary membrane concentration and filtration systems is a filtration system for filtering particles of molecular weight >500 and size >0.005 μm.

9. The method for treating wastewater generated in the spherical nickel hydroxide production process according to claim 4, characterized in that the nanofiltration membrane filtration system (62) of each of the primary membrane concentration and filtration system, the secondary membrane concentration and filtration system and the tertiary membrane concentration and filtration systems is a filtration system for filtering particles of molecular weight of 150-500 and size of 0.0005-0.005 μm.

10. The method for treating wastewater generated in the spherical nickel hydroxide production process according to claim 4, characterized in that the reverse osmosis membrane filtration system of each of the primary membrane concentration and filtration system, the secondary membrane concentration and filtration system and the tertiary membrane concentration and filtration systems is a filtration system for filtering particles of molecular weight of 50-150 and size of 0.0001-0.001 μm.

* * * * *